(12) United States Patent
Olsson

(10) Patent No.: US 9,933,022 B2
(45) Date of Patent: Apr. 3, 2018

(54) SYNCHRONISING DEVICE

(71) Applicant: VOLVO TRUCK CORPORATION, Göteborg (SE)

(72) Inventor: Ronald Olsson, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 11 days.

(21) Appl. No.: 14/892,088

(22) PCT Filed: Jun. 3, 2013

(86) PCT No.: PCT/EP2013/001616
§ 371 (c)(1),
(2) Date: Nov. 18, 2015

(87) PCT Pub. No.: WO2014/194925
PCT Pub. Date: Dec. 11, 2014

(65) Prior Publication Data
US 2016/0091032 A1    Mar. 31, 2016

(51) Int. Cl.
*F16D 23/02* (2006.01)
*F16D 23/06* (2006.01)

(52) U.S. Cl.
CPC ....... *F16D 23/025* (2013.01); *F16D 23/0606* (2013.01); *F16D 23/0612* (2013.01); *F16D 2023/0618* (2013.01); *F16D 2023/0631* (2013.01); *F16D 2023/0668* (2013.01)

(58) Field of Classification Search
None
See application file for complete search history.

(56) References Cited

U.S. PATENT DOCUMENTS

| 2,271,571 | A | 2/1942 | Peterson |
| 4,376,475 | A | 3/1983 | Janiszewski |
| 2004/0154892 | A1* | 8/2004 | Coxon ................... F16D 23/06 |
| | | | 192/53.31 |

FOREIGN PATENT DOCUMENTS

| CN | 1135264 | A | 11/1996 |
| CN | 101684845 | A | 3/2010 |
| DE | 3726486 | A1 | 2/1989 |
| EP | 2166244 | A1 | 3/2010 |

(Continued)

OTHER PUBLICATIONS

International Search Report (dated Feb. 28, 2014) for corresponding International App. PCT/EP2013/001616.

(Continued)

*Primary Examiner* — Jacob S. Scott
*Assistant Examiner* — Timothy Hannon
(74) *Attorney, Agent, or Firm* — WRB-IP LLP

(57) ABSTRACT

A synchronizing device is provided for synchronizing a first rotatable part with a second rotatable part adjacent to the first rotatable part. The synchronizing device includes a first part provided with an engaging sleeve and a second part provided with a synchronizer ring. The synchronizing device has at least one positioning resilient member which is arranged to act upon the synchronizer ring and the second part, in order to allow a design with few parts and also to resynchronize the synchronizing ring with the second part. A transmission including such a synchronizing device is also provided.

13 Claims, 8 Drawing Sheets

(56) References Cited

FOREIGN PATENT DOCUMENTS

JP        63158329 A  *  7/1988  ........... F16D 23/025
JP        H01172659 A     7/1989

OTHER PUBLICATIONS

International Preliminary Report on Patentability (dated Jun. 2, 2015) for corresponding International App. PCT/EP2013/001616.
Chinese Official Action (dated Apr. 27, 2017) for corresponding Chinese App. 201380077171.8.

* cited by examiner

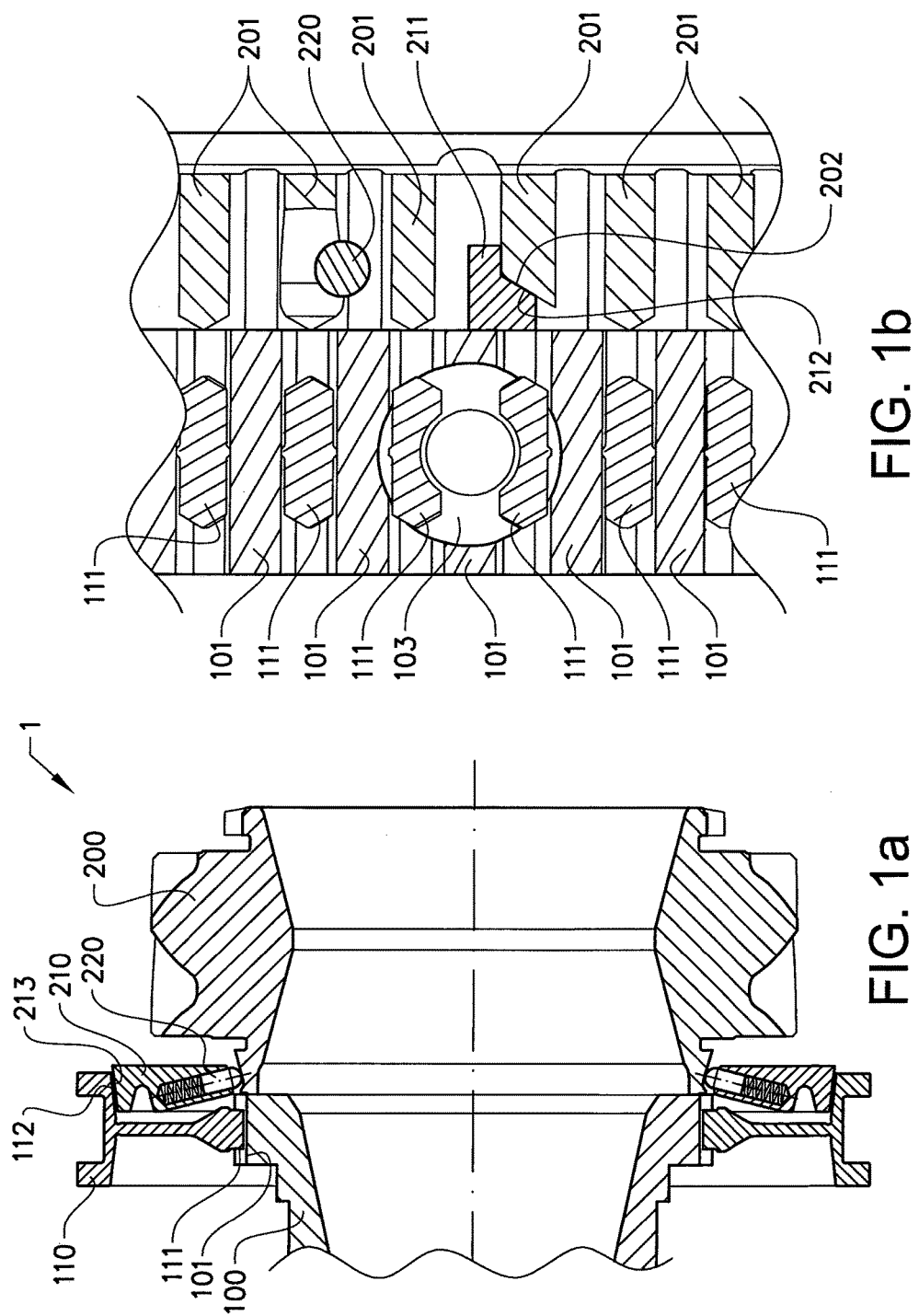

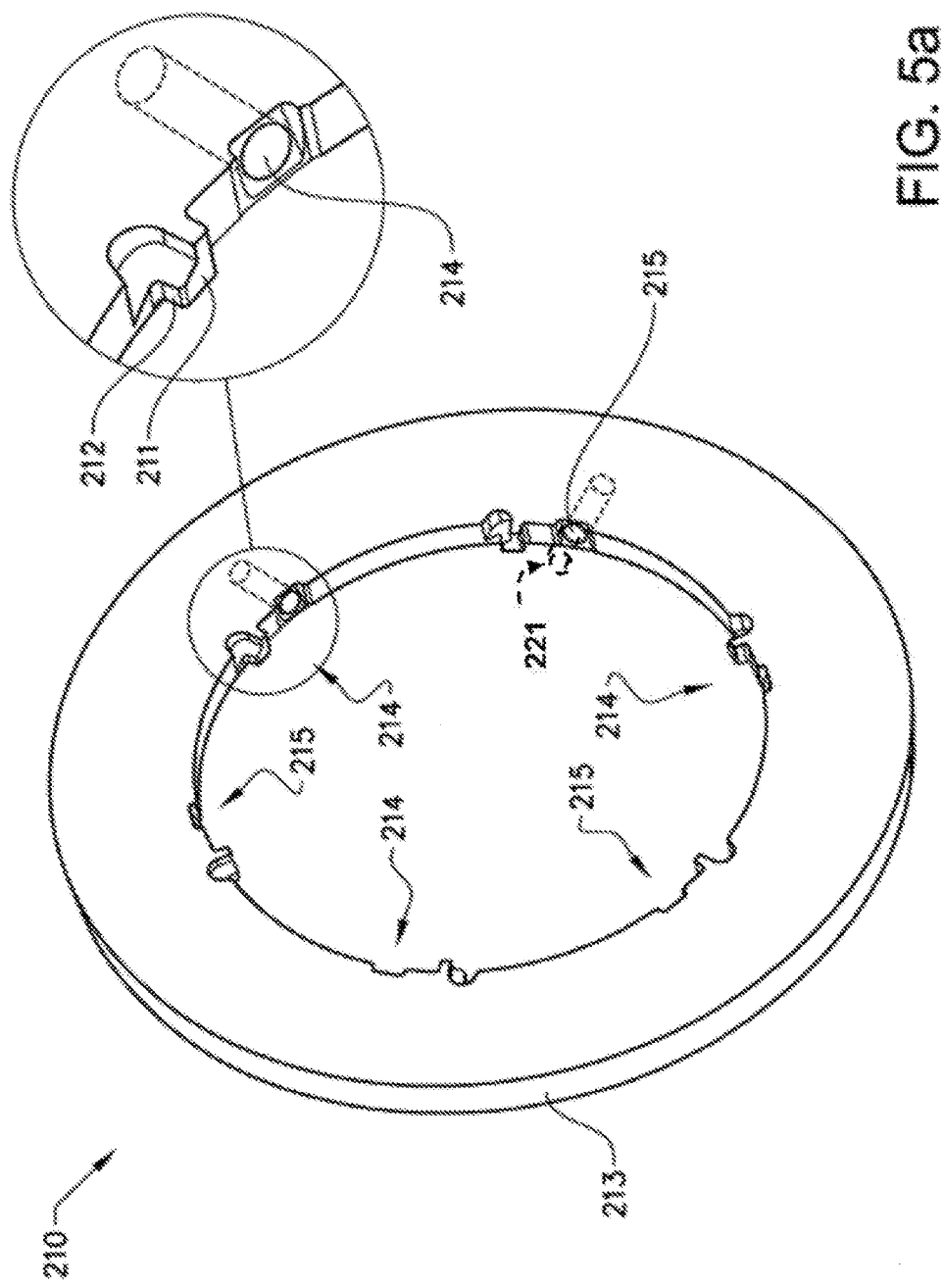

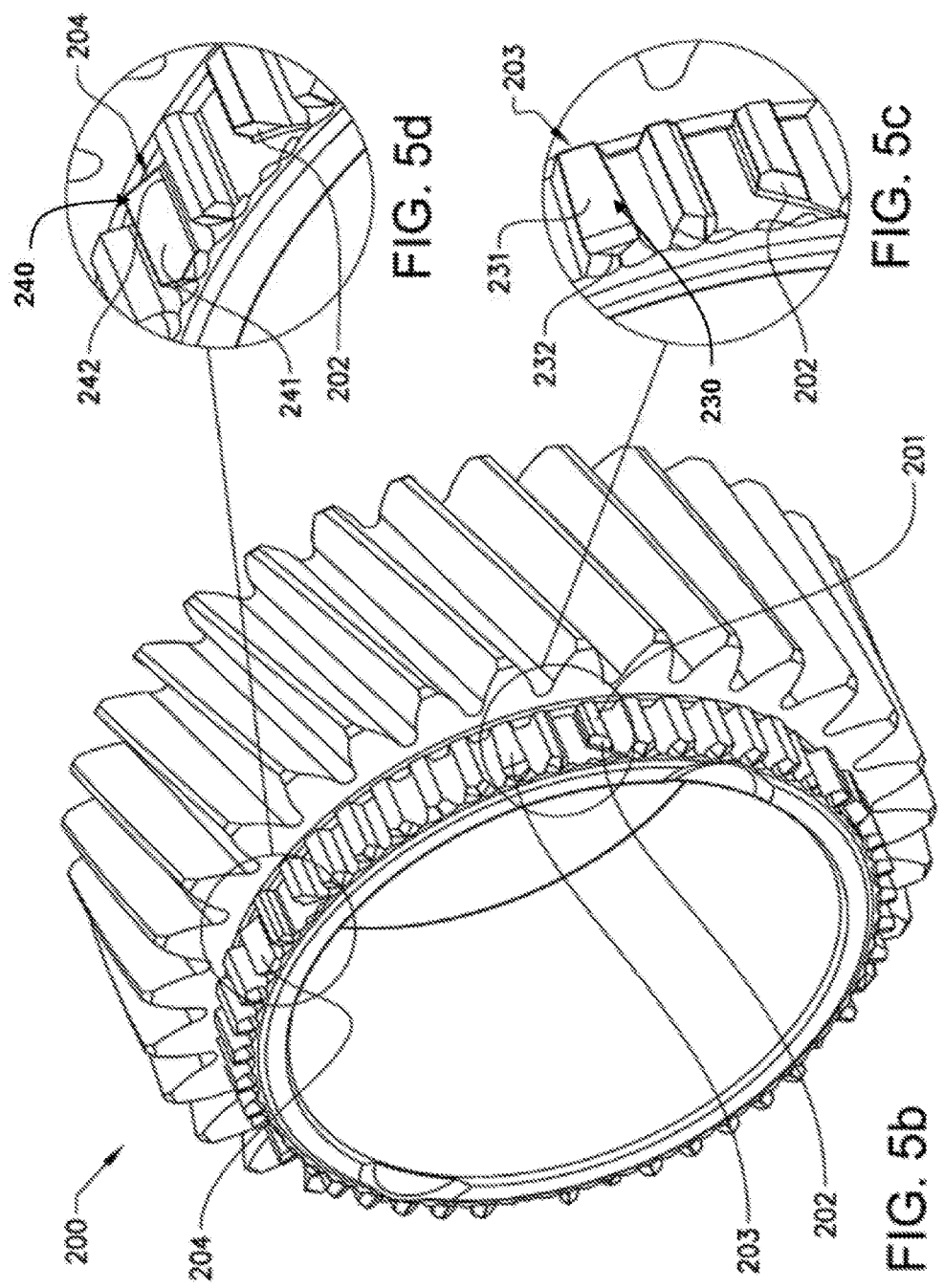

SYNCHRONISING DEVICE

BACKGROUND AND SUMMARY

This invention relates to transmissions and especially to synchronising devices for a transmission and a transmission provided with a synchronising device. The invention is particularly advantageous in the field of transmission in heavy vehicles, such as trucks and buses.

Most modern vehicles are fitted with a synchronized gear box. In such a gear box, the teeth of the gearwheels are permanently meshed. The action of the gear selector is thus not to engage or disengage the teeth of the actual gear, but instead to lock its rotation to the shaft that runs through its hub. When a gear is disengaged, it is unlocked from the shaft and rotates freely.

Locking the shaft with a gearwheel is achieved by means of a so called dog collar. It is splined to, and thus rotates with, the shaft and has gear-like teeth which may engage with corresponding teeth on the gearwheel. The engagement of the two set of teeth lock the rotation of the gearwheel to the dog collar, and thus also to the shaft.

However, if the dog collar and the gearwheel are spinning at different speeds, the teeth will fail to engage and a loud grinding sound will be heard as they clatter together. For this reason, modern dog collars have a synchroniser mechanism that prevents the teeth from making contact before the rotating speeds of the two parts are synchronized. These synchronisers usually comprise a cone clutch and a blocking ring. The cone clutch brings the gearwheel and the dog collar to the same rotational speed using friction, and the blocking ring prevents the teeth from making contact by means of oblique blocking surfaces interacting with corresponding blocking surfaces on the gearwheel. As the speeds are synchronized, the friction force on the blocking ring is revealed and it twists slightly, allowing, engagement of the teeth.

However, the dog collar has to be brought towards gearwheel quite slowly in order to give the blocking surfaces of the dog collar a fair chance to find the corresponding blocking surfaces. If the blocking surfaces fail to find each other, they will not interact and thus cannot prevent the teeth of the dog collar from making contact with the teeth of the gearwheel before their rotational speeds are synchronized.

There is thus a need for an improved synchronising device at least partly removing the above mentioned disadvantage.

It is desirable to provide a product for synchronization of two rotating parts where the previously mentioned problem is at least partly avoided.

The disclosure concerns a synchronising device for synchronising a first rotatable part with a second rotatable part adjacent to said first rotatable part. The synchronising device comprises a first part provided with an engaging sleeve and a second part provided with a synchroniser ring. The first part may typically be a shaft, and the second part may typically be a gearwheel arranged upon an adjacent shaft.

The engaging sleeve is provided with a first set of internal teeth enabling a rotationally fix and axially displaceable arrangement upon said first part, and a first conical friction surface. The engaging sleeve is adapted to be positioned in a first and in a second axial position. In the first axial position, the first set of internal teeth engages only with said first part. Thus, in the first axial position, the first and second parts are not interconnected and the two shafts may rotate independently of each other. In the second axial position, the first set of internal teeth engages with both said first and said second part. Hence the two parts are rigidly interconnected and the two shafts are bound to rotate at the same speed.

The synchroniser ring is provided with a mating conical friction surface adapted to interact with the first conical friction surface in order to synchronise the engaging sleeve and the synchroniser ring, i.e. the first and second parts. Preferably and most commonly, the first conical friction surface is constituted by an internal cone and the mating conical friction surface is constituted by an external cone. The synchroniser ring is further provided with a second set of internal teeth that enables arrangement upon said second part. The second set of internal teeth is provided with a first blocking surface adapted interact with a corresponding second blocking surface upon the second part. The interaction of the blocking surfaces blocks a rotational movement of the synchroniser ring relative to the second part during synchronisation of the rotational speeds of the first and second parts.

The synchroniser ring is adapted to be positioned in a first and a second rotational position relative to the second part. The first rotational position enables said blocking surfaces to interact with each other and the second rotational position enables an axial displacement of the synchroniser ring. The synchroniser ring is further adapted to be positioned in a first and a second axial position. In the first axial position of the synchroniser ring, said blocking surfaces can interact with each other, and in the second axial position the blocking surfaces of the synchronising ring are positioned such that they not face the blocking surfaces of the second part, enabling an axial displacement of the engaging sleeve.

The synchroniser device is characterised in that it has at least one axial positioning resilient member which is arranged to act upon the synchroniser ring and the second part. The axial positioning resilient member is arranged such relative said synchroniser ring and said second part that it exercises a force upon said synchroniser ring in direction towards its first axial position, i.e. towards the first part, when the synchroniser ring is in any position between its first and second axial positions. The force exercised by the at least one axial positioning resilient member is enough to press the synchroniser ring towards its first axial position as long as the engaging sleeve is in, or on its way to, its first axial position. However, the force exercised by the at least one axial positioning resilient member on the synchroniser ring is substantially smaller than the force exercised on the synchroniser ring by the engaging sleeve moving towards its second axial position, i.e. towards the second part. Hence, the axial positioning of the synchroniser ring carried out by the at least one axial positioning resilient member is easily overcome by moving the engaging sleeve in direction of the second part.

The axial positioning resilient member keeps the synchroniser ring in its first position, unless the engaging sleeve acts upon the synchroniser ring in the opposite direction, i.e. towards the second part. With the axial positioning, the synchroniser ring is arranged in the correct axial position for its blocking surfaces to interact with the blocking surfaces on the second part. The synchronising device can be provided with blocking surfaces such that it is able to synchronise rotations in both rotational directions. The axial positioning, also results in less drag losses between the friction surfaces of the engaging sleeve and the synchroniser ring since by preventing the friction surface of the synchronising ring from unintentionally rattling against the conical friction surface of the engagement sleeve. The disclosed arrangement also enables a synchroniser device with fewer parts than in traditional synchronising devices due to the fact that the synchroniser ring acts directly upon the second part, thus providing a simpler and less expensive solution. Further, larger conical friction surfaces can be provided on the engaging sleeve and the synchroniser ring, because the friction surfaces can be provided with a large radius and still be inside the engaging sleeve outer radius, due to that fewer parts are arranged between the engaging sleeve and the second part.

Further advantages are achieved by implementing one or several of the features of the dependent claims.

The at least one axial positioning resilient member may be provided in the synchroniser ring and acts upon an axial reaction surface of said second part, wherein said axial positioning resilient member and said axial reaction surface are arranged such relative each other, that said axial positioning resilient member exercises a force upon said synchroniser ring in direction towards its first axial position. However, it would also be possible to arrange the at least one axial positioning resilient member in the second part, and the corresponding axial reaction surface on the synchroniser ring.

The axial reaction surface may have a radial inwardly directed inclination in an axial direction of said first part. When the axial positioning resilient member acts upon the inclined surface, a reactive force will be executed on the synchroniser ring, in direction towards its first axial position. As a result, synchroniser ring moves axially towards its first axial position, the resilient member sliding upon the inclined surface.

The radial inwardly directed inclination may have a transition to a radial outwardly directed inclination directed in an axial direction of said first part at an end of said axial reaction surface arranged close to said first part. The transition between the inwardly and outwardly directed inclinations forms a groove that functions as a stop for the axial positioning resilient member. The groove prevents the axial positioning resilient member from forcing the synchroniser ring further towards the first part, since its sliding motion is stopped by the groove. The synchroniser ring is in its first axial position when the axial positioning resilient member is positioned in said transition between the inwardly and outwardly inclined axial reaction surfaces. Alternatively, another form of groove or stop can be arranged upon the rotational reaction surface, such as a protrusion or groove or shoulder, instead of the transition between the inwardly and outwardly directed inclinations.

The axial reaction surface may be provided upon a first external tooth of the second part. Such an arrangement provides an advantageous manufacturing process, since the axial reaction surface may be created by an after-treatment process, such as grinding or milling off a portion of a tooth of the second part.

The synchroniser ring may be provided with a plurality of axial positioning resilient embers substantially equally spread about said synchroniser ring. Preferably, the synchroniser is provided with at least three essentially evenly spread out axial positioning resilient members. With axial positioning resilient members acting on the synchroniser ring in evenly spread out points, a balanced positioning of the synchroniser ring can be achieved, avoiding unwanted tilt of the synchroniser ring. Here, evenly spread means that small deviations from absolute evenness are allowed as long as they are small enough in order to be easily compensated for by the internal friction of the device, i.e. between the different parts of the device.

In a preferred embodiment the synchroniser ring is further provided with at least a rotational positioning resilient member, which acts upon a rotational reaction surface of said second part, wherein said rotational positioning: resilient member and said rotational reaction surface are arranged such relative each other, that said rotational positioning resilient member exercises a force upon said synchroniser ring in direction towards its first rotational position. The purpose of the rotational positioning resilient member is thus to bring the synchroniser ring towards its first rotational position. Having the synchroniser ring already provided in its first rotational and axial positions when the synchronisation is to start, i.e. at contact between the conical friction surfaces, results in faster and more reliable synchronisation since the blocking surfaces are already in contact and consequently in the correct position to interact with each other. With both axial and rotational positioning of the synchroniser ring, the synchronisation can be performed faster, because no time has to be spent on letting the corresponding blocking surfaces find each other—they are already in contact when the synchronisation starts. It would also be possible to arrange the rotational positioning resilient member in the second part, and the corresponding rotational reaction surface on the synchroniser ring. However, due to the rotational positioning, the synchroniser device can only synch the rotations between the first and the second parts for that direction the blocking surfaces are adapted for. The inventive synchronising device is therefore especially suitable to be arranged as a range and/or splitter synchronisation.

The axial and rotational positioning members may preferably be constituted by spring loaded plungers.

The rotational reaction surface may be provided with an inclination directed radially inwardly in a circumference direction of said second part. When the rotational positioning resilient member acts this inclination, a reactive force will push the synchroniser ring in the direction towards it first rotational position.

The inclination directed radially inwardly in a first circumference direction of said second part may have a transition to a radial outwardly directed inclination in said first circumference direction of said second part. The transition between the inwardly and outwardly directed inclinations forms a groove that functions as a rotational stop for the synchroniser ring—here is the first rotational position. The groove prevents the rotational positioning resilient member from forcing the synchroniser ring further in rotational direction. Thus, when the rotational positioning resilient member is positioned in the transition between the inwardly and outwardly inclined rotational reaction surfaces, then the synchroniser ring is positioned in its first rotational position. Alternatively, another form of groove or stop can be arranged upon the rotational reaction surface, such as a protrusion or groove or shoulder, instead of the transition between the inwardly and outwardly directed inclinations.

The rotational reaction surface may be provided upon a second external tooth of the second part. Such an arrangement provides an advantageous manufacturing process, since the rotational reaction surface may be created by an after-treatment process, such as grinding or milling off a portion of a tooth of the second part.

As an alternative to or in combination with inclined rotational reaction surfaces, the rotational positioning resilient member may be arranged with direction of action having an angle to a radial direction of the synchronising ring. The rotational positioning resilient member can thereby become a larger lever for the spring force.

An alternative position of the rotational reaction surface is constituted by a flank of an external tooth of the second part.

Such an arrangement utilizes the original geometry of the external tooth of the second part, and thus no after-treatment such as grinding or milling is needed.

The synchroniser ring may be provided with a plurality of rotational positioning resilient members substantially equally spread about said synchroniser ring. Preferably, the synchroniser is provided with at least three evenly spread out rotational positioning resilient members. With axial positioning resilient members acting on the synchroniser ring in evenly spread out points, a balanced positioning of the synchroniser ring can be achieved, avoiding unwanted tilt of the synchroniser ring. Here, evenly spread means that small deviations from absolute evenness are allowed as long as they are small enough in order to be easily compensated for by the internal friction of the device, i.e. the friction between the different parts of the device.

The engaging sleeve may be provided with a groove provided in an axial central position among said first set of inner teeth. The groove is adapted to interact with a detent resilient member arranged in the first part. The detent resilient member acts radially outwards such that it holds the engaging sleeve in its first position, in which it only engages with the first part.

Said detent resilient member may be able to hold said engaging sleeve in its second position, by protruding outside the first set of inner teeth. The detent resilient member thus keeps the engaging sleeve in an engaged position, preventing it from unintentionally unlocking the rotational motions of the first and second parts.

Said detent resilient member is preferably a spring loaded plunger.

The axial resilient positioning member and the rotational axial positioning member can be provided as individual resilient members or as a combination member, performing both the axial and the rotational positioning. If the rotational and axial positioning members are integrated in the same resilient positioning member, the reaction surfaces are correspondently adapted.

The invention further concerns a transmission provided with a synchronising device as described above.

BRIEF DESCRIPTION OF THE DRAWINGS

In the detailed description of the disclosure given below reference is made to the following schematic figures, in which:

FIG. 1a shows a cross-sectional layout of the synchronising device in its neutral position, FIG. 1b shows a cut in the plane of the engaging teeth, the synchronising device being in its neutral position, FIG. 5a shows a synchroniser ring of the synchronising device, FIG. 5b shows a gearwheel of synchronising device, FIG. 5c shows a detailed view of an axial reaction surface, FIG. 5d shows a detailed view of a rotational reaction surface.

DETAILED DESCRIPTION

Figure 2B:
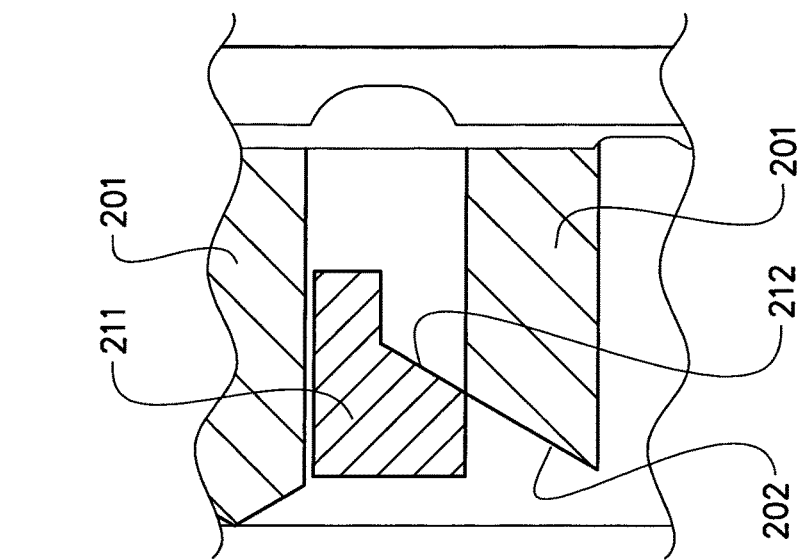
FIG. 2b shows a cut in the plane of the engaging teeth when the speeds of the two rotating parts have just been synchronised.

Various aspects of the invention will hereinafter be described in conjunction with the appended drawings to illustrate but not to limit the invention. In the drawings, like designations denote like elements. Variations of the different aspects are not restricted to the specifically shown embodiment, but are applicable on other variations of the disclosure.

Figure 3A:
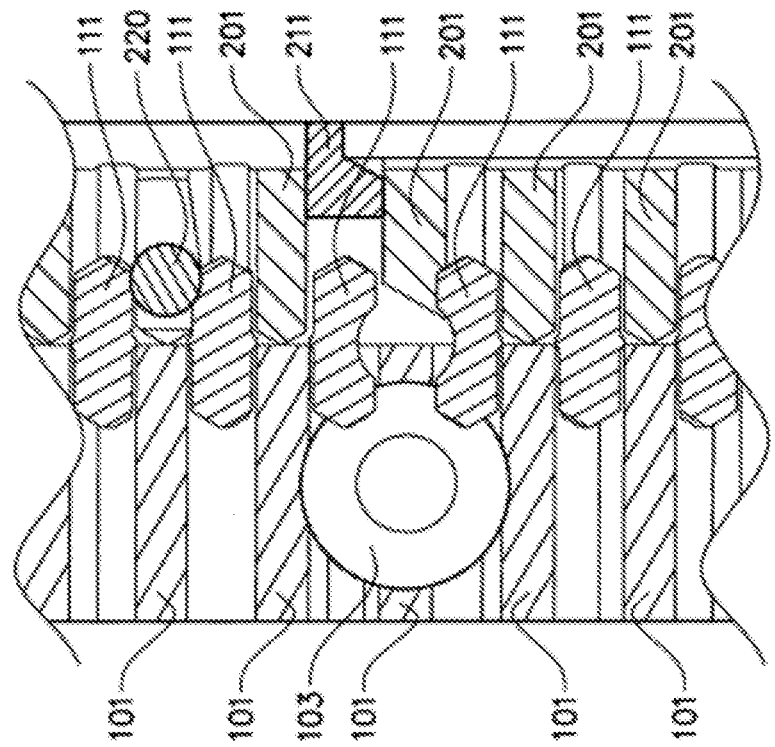
FIG. 3a shows a cross-sectional layout of the synchronising device with the engaging sleeve being engaged with the second part.
Figure 3B:
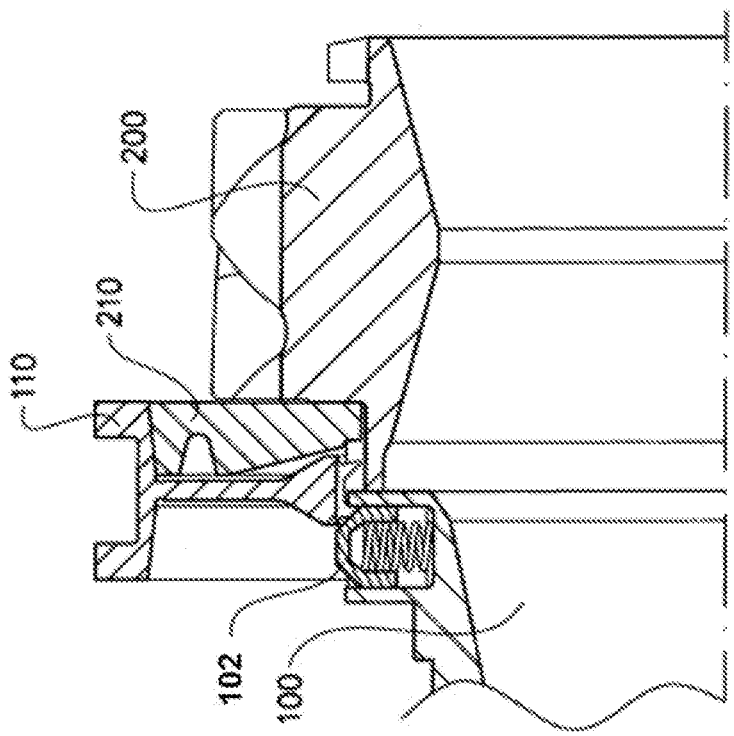
FIG. 3b shows a cut in the plane of the engaging teeth with the engaging sleeve being engaged with the second part.

FIG. 1a shows a cross-sectional layout of the synchronising device 1 in its neutral position, which is also the position at the start of the synchronising process. The synchronising device 1 comprises of a input shaft (first part) 100, a gearwheel (second part) 200, an engaging sleeve 110 and a synchroniser ring 210. FIG. 1b shows a cut in a plane through a first set of external teeth 101 of the input shaft 100 and a first set of internal teeth 111 of the engaging sleeve 110. The input shaft 100 is provided with an engaging sleeve 110. The engaging sleeve 110 is provided with a first set of internal teeth 111, as shown in FIG. 1b, that engages with a corresponding set of external teeth 101 on the input shaft 100. This enables a rotationally fixed but axially displaceable arrangement of the engaging sleeve 110 upon the input shaft 100, i.e. the engaging sleeve 110 can move axially between a first axial position where its first set of internal teeth 111 engages only with the teeth 101 of the input shaft 100 (as shown in FIGS. 1a and 1b) and a second axial position where its internal teeth engages with both the first set of external teeth 101 of the input shaft 100 and the second set of external teeth 111 of the gearwheel 200 (as shown in FIGS. 3a and 3b), thus locking their rotational motions. The engaging sleeve 110 further comprises a first conical friction surface 112.

The input shaft 100 may further comprise at least one detent resilient member 102, for example a spring-loaded detent plunger, which is adapted to interact with a groove 113 in the engaging sleeve 110 in order to keep the engaging sleeve in its neutral, disengaged position, as long as no actuating force is acting on it. Preferably, the input shaft 100 comprises at least three and even more preferably six detent resilient members 102.

In order for the engaging sleeve 110 to be able to smoothly enter its second position and engage with the second part, the rotational speeds of the first and second parts 100, 200 have to be synchronised.

For this purpose, the gearwheel 200 is provided with a synchroniser ring 210. The arrangement of the synchroniser ring 210 upon the second part 200 is enabled by a second set of internal teeth 211 that engages with a second set of external teeth 201 on the gearwheel 200. A second set of internal teeth 211 of the synchroniser ring engages with a second set of external teeth 201 on the gearwheel 200. This arrangement fixes the synchroniser ring 210 rotationally to the gearwheel 200, but allows axial displacement. However, the teeth in the second set of internal teeth 211 are slightly narrower than the gaps in the second set of external teeth 201, which permits a slight rotation of the synchroniser ring 210 in relation to the gearwheel 200. The second set of internal teeth 211 of the synchroniser ring 210 is provided with at least one first blocking surface 212 which is adapted to interact with a corresponding second blocking surface 202 upon the second set of external teeth 201 of the second part in order to prevent an axial motion of the synchroniser ring 210, and thus preventing the engaging sleeve from engaging with the gearwheel 200, during the process of synchronising the rotational speeds of the first and second parts. In FIG. 1b, the synchroniser ring 210 is shown in its first axial and rotational positions where its first blocking surface 212 can interact with the second blocking surface 202 of the gearwheel 200. The synchroniser ring 210 further comprises a mating conical friction surface 213 which is adapted to interact with the conical friction surface 112 of the engaging sleeve 110 in order to synchronise the speeds of the input shaft 100 and the gearwheel 200 by means of friction. During synchronisation, the frictional force on the synchroniser ring 210 act as to press the first blocking surface 212 against the second blocking surface 202, the shapes of the blocking surfaces preventing the synchroniser ring 210 from moving axially in the direction of the gearwheel 200. The function of the blocking surfaces is well known to the person skilled in the art.

Furthermore, an axial positioning resilient member 220 is arranged to act upon the synchroniser ring 210 and the gearwheel 200 such that it exercises a force upon the synchroniser ring towards a first axial position in which the blocking surfaces 212, 202 of the synchroniser ring 210 and the second part 200 can interact. In the example of FIG. 1a, the axial positioning resilient member 220 is constituted by a spring loaded plunger.

Figure 2A:
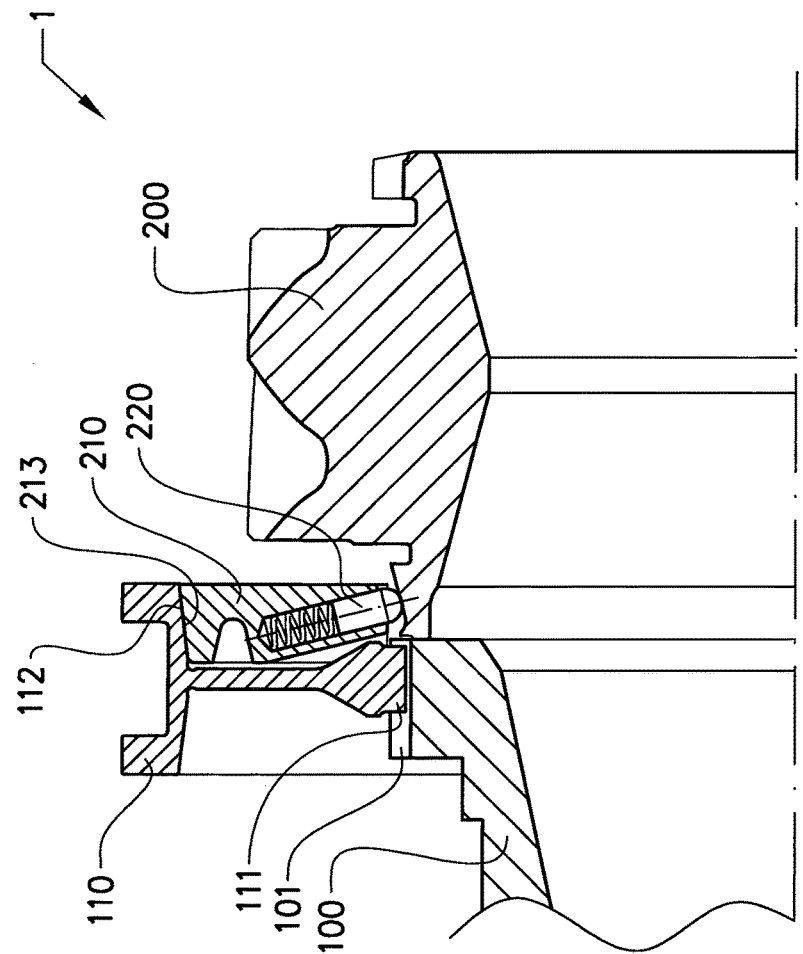
FIG. 2a shows a cross-sectional layout of the synchronising device when the speeds of the two rotating parts have just been synchronised.

FIG. 2a shows a cross-sectional layout and FIG. 2b shows a cut in the plane of the engaging teeth of the synchronising device 1, when the speeds of the input shaft 100 and the gearwheel 200 have just been synchronized by means of friction between the conical friction surface 112 and the mating conical friction surface 213. When the speeds of the input shaft 100 and the gearwheel 200 have become synchronised, there will no longer be any frictional forces between the conical friction surfaces 112, 213 since the engaging sleeve 110 and the synchroniser ring 210 now rotate at the same speed. As the frictional force on the synchroniser ring 210 ceases, the blocking surfaces 212, 202 cease to be pressed together and the synchronization ring 210 will rotate slightly as to reach a rotational position where the synchroniser ring 210 can move axially in the direction towards the second part.

FIG. 3a shows a cross-sectional layout and FIG. 3b shows a cut in the plane of the engaging teeth of the synchronising device with the engaging sleeve being engaged with the second part. Here, the synchroniser ring 210 has moved to its second axial position, where its internal teeth 211 are fully inserted between the external teeth 201 of the gearwheel 200. The engaging sleeve 110 has followed the synchroniser ring 210 in its axial movement. Here, in its second axial position, the internal teeth 111 of the engaging sleeve 110 are engaged with both the external teeth 101 of the input shaft 100 and the external teeth 201 of the gearwheel 200, thus interconnecting and locking the rotations of the input shaft 100 and the gearwheel 200 to each other.

When the engaging sleeve 110 reaches its second axial position, the at least one detent resilient member 102 protrudes outside the first set of internal teeth in order to keep the engaging sleeve 110 in said second axial position.

Figure 4A:
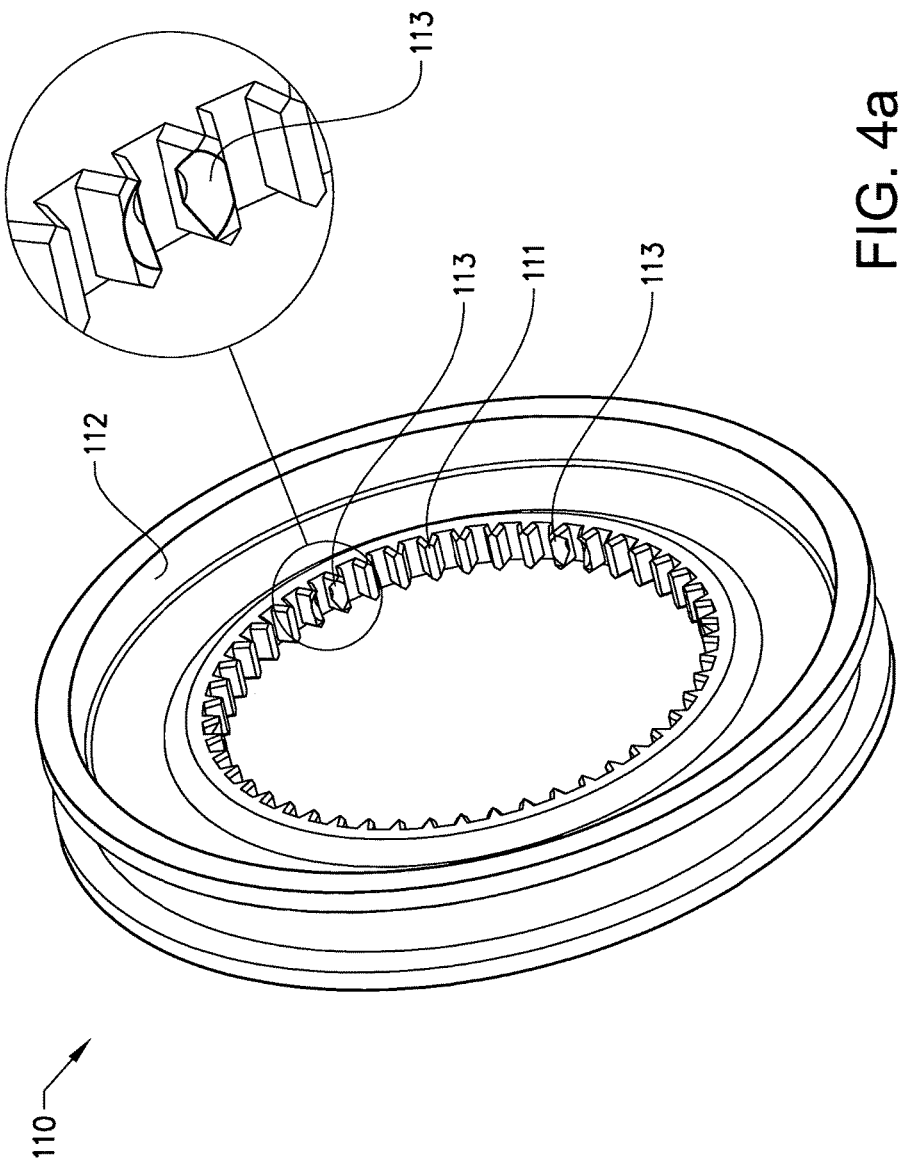
FIG. 4a shows an engaging sleeve of the synchronising device.

FIG. 4a shows a perspective view of an engaging sleeve 110 of the disclosed synchronising device. A first set of internal teeth 111 fixes the engaging sleeve 110 rotationally on a rotatable input shaft 100, but allows axial displacement. Consequently, the engaging sleeve 110 does always rotate at the same speed as the input shaft 100. A conical friction surface 112 is adapted to interact with a mating conical friction surface 213 during synchronisation, and grooves 113 are provided for interacting with detent resilient members 102 arranged in the input shaft 100.

Figure 4B:
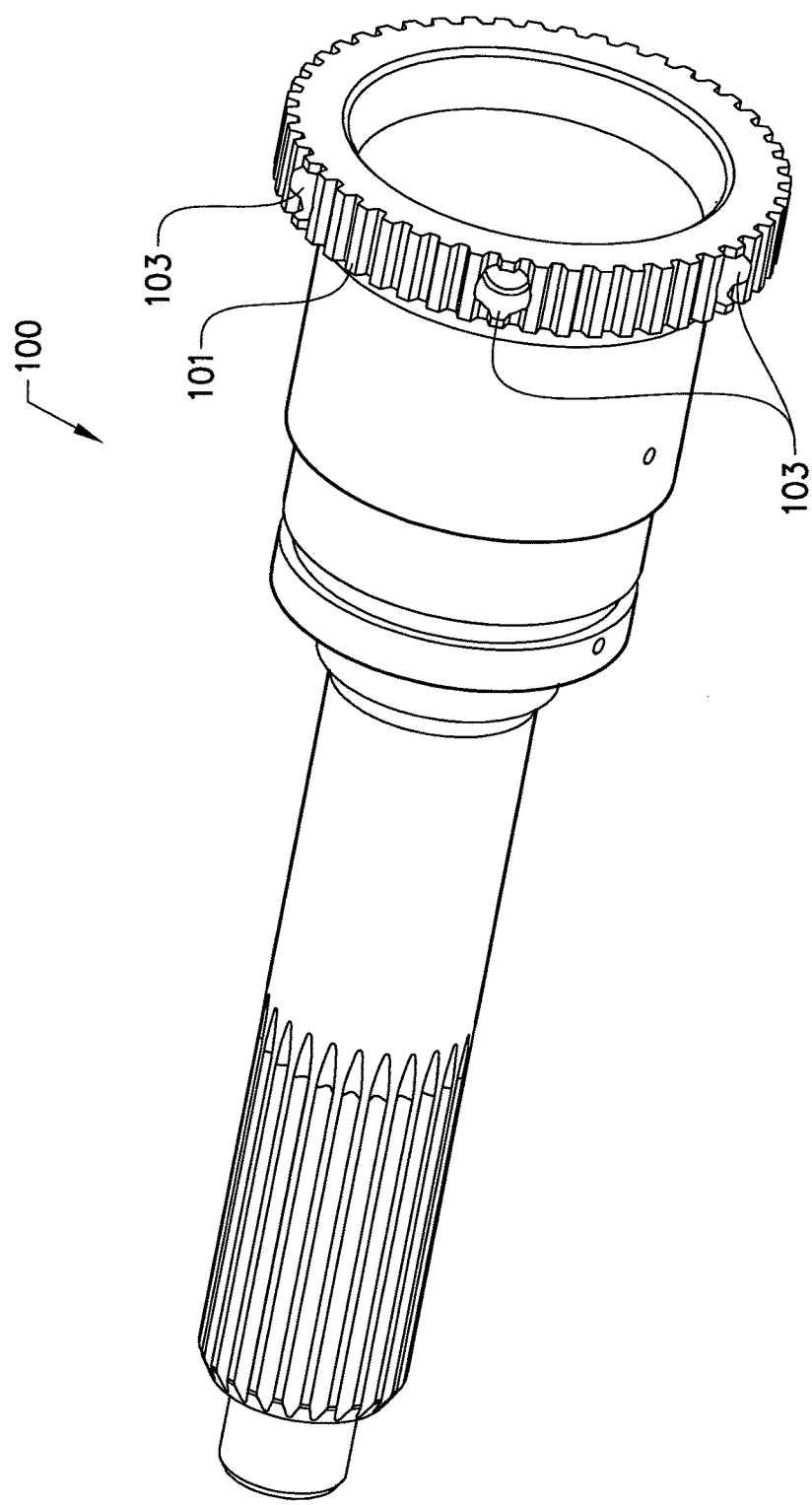
FIG. 4b shows a shaft of the synchronising device.

FIG. 4b shows a perspective view of an input shaft 100, a part that typically constitute the rotatable first part in the disclosed synchronising device. This example of an input shaft 100 has a first set of external teeth 101, so called splines, with which the first set of internal teeth 111 of the engaging sleeve 110 are engaged. This arrangement prevents rotational displacement but allows axial displacement of the engaging sleeve 110 in relation to the shaft. Furthermore, the input shaft is provided with a first set of holes 103, wherein each hole is adapted for housing a detent resilient member 102. Preferably, the first set of holes 103 comprises at least three holes and even more preferably six holes as shown in the example of FIG. 4b, but there may be more or fewer holes or no holes at all, dependent on the desired amount of detent resilient members 102.

FIG. 5a shows a perspective view of an example of a synchroniser ring 210 of the disclosed synchronising device. The second set of internal teeth 211, which comprises six internal teeth 211, is situated on the inside of the synchroniser ring. The number of internal teeth 211 can however be varied, whereby at least three internal teeth 211 is preferred, in order to achieve a balanced arrangement. The teeth ends are provided with a first blocking surface 212. The mating conical friction surface 213 is situated on the exterior of the synchronising ring 210. The synchronising ring 210 further comprises a second set of holes 214, wherein each hole is adapted for housing an axial positioning resilient member 220. The second set of holes 214 comprises at least one hole, and preferably it comprises three holes. The synchronising ring 210 also comprises a third set of holes 215, wherein each hole is adapted for housing a rotational positioning resilient member 221. The third set of holes 215 comprises at least one hole, and preferably it comprises three holes. The holes of the second and third set of holes 214, 215 may extend radially, i.e. perpendicularly to the surface, into the synchronising ring 210, as shown in FIG. 5a, or they may be arranged at an angle to a radial direction of the synchronising ring 210.

FIG. 5b shows a perspective view of the second part, typically constituted by a gearwheel 200. The second part 200 is provided with a second set of external teeth 201, with which the second set of internal teeth 211 of the synchroniser ring 210 engages. Some of the teeth in the second set of external teeth 201 are provided with a second blocking surface 202. The number of teeth in the second set external teeth 201 provided with a second blocking surface 202 should equal the number of first blocking suffices 212 on the synchroniser ring 210, since the first and second blocking surfaces 202, 212 are adapted to interact with each other. Some of the teeth in the second set of external teeth 201 are provided with an axial reaction surface 203 or a rotational reaction surface 204 respectively, as shown and in greater detail in FIGS. 5c and 5d.

In an alternative not shown embodiment, the axial positioning resilient member and the rotational positioning resilient member is the same resilient member, and which thereby acts upon a combined reaction surface, having both the inclinations of the axial and rotational reaction surfaces 203, 204.

FIG. 5c shows an enlargement of an axial reaction surface 203 on a first external tooth 230 in the second external set of teeth 201 of the second part 200. The axial reaction surface 203 comprises a first inclination 231 which is radially inwardly directed in axial direction of the first part 100 and a second inclination 232 which is radially outwardly directed in axial direction of the first part 100. This inclined axial reaction surface 203 is adapted to interact with an axial positioning resilient member 220 which is arranged in a perpendicular hole of the second set of holes 214 of the synchronising ring 210. When the axial positioning resilient member 220 presses against the first inclination 231, a reaction force acts on the axial positioning resilient member 220 in the axial direction of the first part 100. The axial positioning resilient member 220 will consequently slide down the inclination in direction of the first part 100, bringing along the synchroniser ring 210 in which it is housed. The movement in direction of the first part 100 ends when the axial resilient positioning member 220 reaches the transition between the first and second inclinations 231, 232. As long as no external force acts on the synchroniser ring 210, it will remain in this position, referred to as the first axial position of the synchroniser ring 210. Thus, in summary, the purpose of the axial reaction surfaces 203 and the axial resilient positioning members 220 is to bring the synchroniser ring 210 to its first axial position and to keep it there unless no other forces act on it.

FIG. 5d shows an enlargement of a rotational reaction surface 204 on a second external tooth 240 in the second external set of teeth 201 of the gearwheel 200. The rotational reaction surface 204 comprises a third inclination 241 which is radially inwardly directed in a first circumference direction of the second part 200 and a fourth inclination 242 which is radially outwardly directed in said first circumference direction of the gearwheel 200. This inclined rotational reaction surface 204 is adapted to interact with a rotational positioning resilient member 221 which is arranged in a hole of the second set of holes 214 of the synchronising ring 210. When the rotational positioning resilient member 221 presses against the third inclination 241, a reaction force acts on the rotational positioning resilient member 221 in said first circumference direction. The rotational positioning resilient member 221 will consequently slide down the inclination in said first circumference direction, and thereby rotate the synchroniser ring 210 in which it is housed. The movement of the synchroniser ring 210 in said first circumference direction ends when the rotational resilient positioning member 221 reaches the transition between the third and fourth inclinations 241, 242. This position, in which the rotational resilient positioning member 221 rests in the groove that is formed by the transition between the third and fourth inclinations 241, 242 corresponds to the first rotational position of the synchroniser ring 210. A prerequisite for the synchroniser ring to be able appear in its first rotational position is that the synchroniser ring 210 simultaneously is in its first axial position. In the said first rotational position, the first blocking surfaces 212 of the synchroniser ring 210 are enabled to interact with the second blocking surfaces 202 of the second part 200. Thus, in summary, the purpose of the rotational reaction surfaces 204 and the rotational resilient positioning members 221 is to bring the synchroniser ring 210 to its first rotational position and to keep it there unless the engaging sleeve 110 exercises a force on the synchronisation ring 210 in order to initiate a synchronisation. When the synchroniser ring is arranged in its first axial position and first rotational position, the blocking surfaces 202, 212 of the synchroniser ring and the gearwheel 200 is mating and a synchronisation can start immediately at initiation by the engaging sleeve.

However, within the scope of this invention, it is possible to have a gearwheel with only axial positioning resilient members 220, whereby a synchronisation between the first and second part 100, 200 can be made in both rotational directions.

Figure 6:
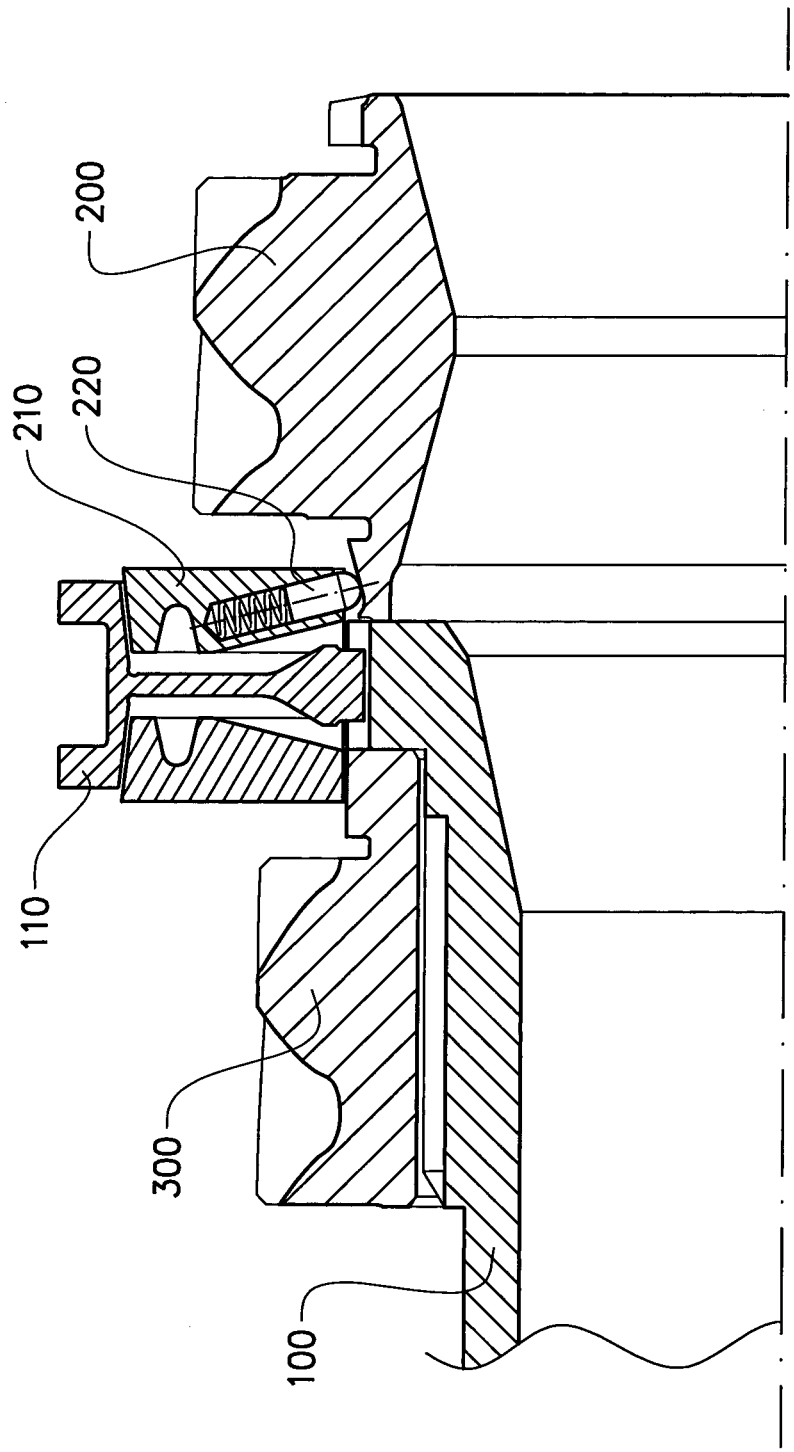
FIG. 6 shows a cross-sectional layout of a double-sided synchronising device.

FIG. 6 shows a cross-sectional layout of a double-sided synchronising device 1. This device comprises a second gearwheel 300, i.e. third part. The third part is arrange correspondently as the second part 200, however arranged on the other axial side of the engaging sleeve 110. The third part 300 can be provided with the same features as already described for the second part 200.

The second and third part 200, 300 may be adapted for only axial positioning or for both axial and rotational positioning independently of each other. Any combination of these variants of second and third parts 200, 300 fall within the scope of this invention.

The invention is capable of modification in various obvious respects, all without departing from the scope of the appended claims. Accordingly, the drawings and the description thereto are to be regarded as illustrative in nature, and not restrictive.

Reference signs mentioned in the claims should not be seen as limiting, the extent of the matter protected by the claims, and their sole function is to make the claims easier to understand.

The invention claimed is:

1. A synchronising device for synchronising a first rotatable part with a second rotatable part adjacent to the first rotatable part, wherein the synchronising device comprises:
a first rotatable part provided with an engaging sleeve, and
a second rotatable part provided with a synchroniser ring, wherein the engaging sleeve is
provided with a first set of internal teeth enabling a rotationally fix and axially displaceable arrangement upon the first rotatable part,
provided with a first conical friction surface, and
is adapted to be positioned in a first and a second axial position, wherein in the first axial position the first set of internal teeth engages only with the first rotatable part and in the second axial position, the first set of internal teeth engages with both the first and the second rotatable part, wherein the synchroniser ring is
provided with a mating conical friction surface, wherein the first conical friction surface and the mating conical friction surface are adapted to interact with each other in order to synchronise the engaging sleeve and the synchroniser ring of the first and second rotatable parts,
provided with a second set of internal teeth enabling an arrangement upon the second rotatable part, wherein the second set of internal teeth is provided with a first blocking surface adapted to interact with a corresponding second blocking surface upon the second rotatable part,
adapted to be positioned in a first and a second axial position, wherein in the first axial position the blocking surfaces can interact with each other and the second axial position enables engagement of the engaging sleeve with the second rotatable part, and
adapted to be positioned in a first and a second rotational position relative to the second rotatable part, wherein the first rotational position enables the blocking surfaces to interact with each other and the second rotational position enables an axial displacement of the synchroniser ring, wherein
the synchronising device further comprises at least an axial positioning resilient member arranged relative to the synchroniser ring and the second rotatable part such that the axial positioning resilient member exerts a force upon the synchroniser ring in a direction towards the first axial position of the synchroniser ring, wherein the axial positioning resilient member acts upon an axial reaction surface of the second rotatable part, and the axial reaction surface is provided upon a first external tooth of the second rotatable part.

2. The synchronising device according to claim 1, wherein the axial reaction surface has a radial inwardly directed inclination in an axial direction of the first rotatable part.

3. The synchronising device according to claim 2, wherein the radial inwardly directed inclination has a transition to a radial outwardly directed inclination directed in an axial direction of the first rotatable part at an end of the axial reaction surface arranged close to the first rotatable part.

4. The synchronising device according to claim 1, wherein a plurality of axial positioning resilient members is provided substantially evenly spread about the synchronizer ring.

5. The synchronising device according to claim 1, wherein the synchroniser ring is further provided with at least one rotational positioning resilient member, which acts upon a rotational reaction surface of the second rotatable part, wherein the rotational positioning resilient member and the rotational reaction surface are arranged such relative each other, that the rotational positioning resilient member exercises a force upon the synchroniser ring in direction towards its first rotational position.

6. The synchronising device according to claim 5, wherein the rotational reaction surface, is provided with an inclination directed radially inwardly in a first circumference direction of the second rotatable part.

7. The synchronising device according to claim 6, wherein the inclination directed radially inwardly in a first circumference direction of the second rotatable part has a transition to a radially outwardly directed inclination in the first circumference direction of the second rotatable part.

8. The synchronising device according to claim 6, wherein the rotational positioning resilient member is arranged with direction of action having an angle to a radial direction of the synchroniser ring and the rotational reaction surface is constituted by an original flank of a second external tooth of the second rotatable part.

9. The synchronising device according to claim 6, wherein a plurality of rotational positioning resilient members are provided and substantially evenly spread about the synchronising ring.

10. The synchronising device according to claim 5, wherein the rotational reaction surface is provided upon a second external tooth of the second rotatable part.

11. The synchronising device according to claim 1, wherein engaging sleeve is provided with a groove provided in an axial central position among the first set of internal teeth, wherein the groove is adapted to interact with a detent resilient member arranged in the first rotatable part, and the detent resilient member acts radially outwards such that it holds the engaging sleeve in its first position.

12. The synchronising device according to claim 11, wherein the detent resilient member is able to hold the engaging sleeve in its second position, by protruding outside the first set of internal teeth.

13. A transmission provided with the synchronizing device according to claim 1.

\* \* \* \* \*